INVENTOR
Elliott E. Grover

United States Patent Office 3,423,279
Patented Jan. 21, 1969

3,423,279
SOLID BEARING INSERTS IN DIE CASTINGS
Elliott E. Grover, Columbus, Ohio, assignor to Westinghouse Electric Corporation, Pittsburgh, Pa., a corporation of Pennsylvania
Filed Sept. 19, 1966, Ser. No. 580,466
U.S. Cl. 161—189                      1 Claim
Int. Cl. B32b 27/06; B32b 27/30; F16c 33/00

ABSTRACT OF THE DISCLOSURE

A bearing insert in a die casting including a die casting, a relatively thin bearing insert embedded in the casting, and a thin heat shield layer disposed between the casting and the insert. The bearing insert comprises a metal matrix and a solid lubricant such as a diselenide or disulfide of tungsten or molybdenum. The heat shield layer is composed of a material having a maximum coefficient of thermal conductivity of about 0.03 calorie and is composed of a high temperature material such as polytetrafluoroethylene which is filled with a material such as glass fiber.

---

Figure 1:
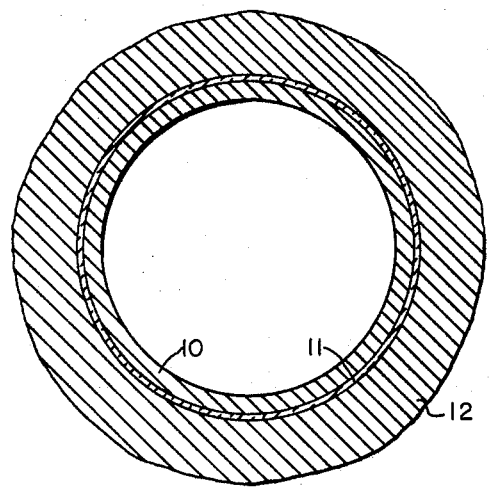

This invention relates to solid bearings and more particularly to disposing self-lubricating bearing inserts in die castings.

The designing of a compressor which is compact, has good efficiency, and has an acceptable overall cost introduces many problems one of which is adequate bearing life when operating the compressor at temperatures in the order of 300° F. or higher. Frequently, circulating oil is employed to control temperature by transferring heat away from the motor and pump unit of a compressor. However, the properties of oil are such that it is a heat-limiting factor in itself and its elimination would permit alteration of the basic compressor design to permit much higher operating temperatures.

Self-lubricating bearings embodying solid lubricant would be ideal substitutes for oil-lubricated bearings in die castings. Solid bearings could be inserted in die castings and enable the use of completed compressor assemblies for operation at much higher temperatures than has been possible heretofore. Prior attempts, however, to provide a die casting with integral bearing inserts have been unsatisfactory, because the bearing is damaged by the heat of the die cast material such as a metal or alloy during the casting cycle. For example the temperature of molten aluminum as it is being die-cast may be as high as 1500° F.

It has been found that the foregoing problems may be overcome by providing the solid bearing insert with a coating of a heat-shielding material which prevents the heat from the die cast metal from damaging the bearing insert during casting of the die cast metal. As a result, satisfactory solid bearings disposed in die castings may be provided for such products as motors, and moving parts in die cast structures.

Accordingly, it is an object of this invention to provide for successfully mounting a solid bearing insert in a die casting.

It is another object of this invention to provide for embedding a solid self-lubricating bearing in a die casting by providing heat shielding on a bearing insert and die casting metal therearound so as to avoid damage to the bearing insert.

It is another object of this invention to provide a solid self-lubricating bearing insert as a unitary part of a die casting.

Finally, it is an object of this invention to provide a solid bearing insert which accomplishes the foregoing objects and desiderata in a simple and effective manner.

Briefly, the present invention is directed to a unitary casting in which is embedded a solid self-lubricating bearing which comprises (1) a die cast body member, (2) a solid lubricant bearing insert having superior mechanical strength and oxidation resistance at high bearing operating temperatures, and (3) a heat shielding coating or layer on the insert disposed between the bearing insert and the die cast member so as to prevent the heat of the molten die casting metal from damaging or deteriorating the bearing insert.

The invention also comprises a method for producing the unitary die casting with a bearing insert embedded at a surface thereof which method includes the steps of (1) placing a bearing insert in position on the wall of a die casting mold and adjacent to a mold cavity, the surface area of the bearing insert facing the cavity being coated with a high temperature heat shielding material having a coating thickness of from about 3 to 10 mils, casting molten casting material having a melting temperature ranging from about 900° F. to 1500° F. into the mold cavity and in contact with the coated insert, and solidifying the liquid material in the mold to form a cast member with the bearing insert firmly secured thereto.

Figure 2:
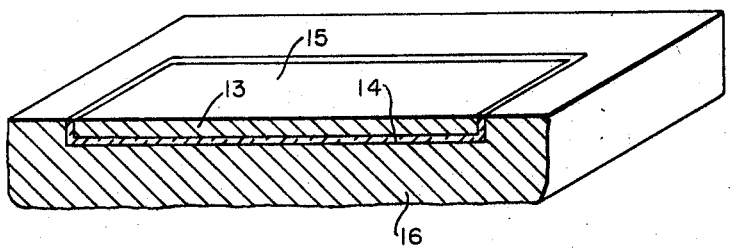
Figure 3:
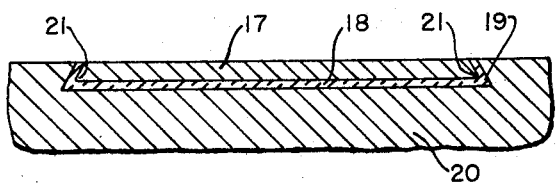

Other objects and advantages of the present invention will become apparent when considered in conjunction with the following detailed description and the accompanying drawings, in which:

FIGURE 1 is a fragmentary sectional view through a die casting having a circular self-lubricating bearing insert attached thereto with a thermal shield coating therebetween;

FIG. 2 is a fragmentary perspective view, partly in cross section through another embodiment of the invention including a die cast body having a flat self-lubricating bearing embedded therein and having a heat shield material therebetween; and FIG. 3 is a fragmentary sectional view of another embodiment of the invention showing a self-lubricating bearing secured in place by an interlocking dovetail joint.

In accordance with the present invention, in FIG. 1 a unitary structure 8, as for example, a compressor frame, comprises a bearing 10 having an arcuate configuration such as a sleeve bearing, is provided with a coating 11 of heat shielding material by which the bearing is firmly secured to a solidified die cast body 12. In FIG. 2, a flat bearing 13 provided with a coating 14 of heat shielding material is secured in a die cast body 16. The bearing 13 has a flat surface 15 provided as an antifriction surface with respect to a sliding part moving thereover. In FIG. 3 a bearing 17 is similarly provided with a coating 18 of heat shielding material which is mounted in an undercut recess 19 of a die cast body 20. The recess 19 is dovetailed as shown or otherwise undercut to receive an interfitting tapered end 21 of the bearing 17 and thereby interlocking the bearing in place against dislodging by any reasonable force.

Suitable die casting metals for use in practicing the invention are aluminum, aluminum base alloys, copper, and copper base alloys such as 60–40 copper-zinc.

The composition of the bearings 10, 13 and 17 is preferably a mixture of materials having self-lubricating characteristics and oxidation stability. Because of their cost and other factors, the bearings are usually thin—from 0.1 inch to 0.3 inch thick. Such mixture includes a metal matrix of nickel, silver, iron, copper, or gold with solid lubricant particles of diselenides and disulfides of molybdenum and tungsten or of calcium difluoride or boron nitride or two or more thereof embedded therein. The metal matrix may include particles of a high temperature resin distributed therein. For example, finely divided polytetrafluoroethylene may be present in the bearings. The bearing insert 10, 13 or 17 is adversely affected and may be seriously damaged when heated to 1500° F. The member may be warped or caused to flow, and the solid lubricant such as molybdenum disulfide will readily oxidize at these temperatures to abrasive molybdenum oxide. Further, a solid lubricant insert, particularly for sleeve bearings, may be selected to operate against a cast iron piston ring in a cylinder for a compressor for such devices as refrigerators and air conditioners. Such bearings have superior anti-friction properties at temperatures of up to 300° F. under vacuum or in air or other atmosphere including subzero use. The compositions and the manner of making such solid lubricants are disclosed in copending applications having Ser. Nos. 321,302 and 511,438 and this disclosure thereof is incorporated herein.

The heat shielding coatings 11, 14 and 18 are primarily composed of thermally insulating compounds having a thermal conductivity coefficient of about 0.03 calorie or less. The preferred materials comprising the coating will not oxidize the metal nor bearing outgas at temperatures up to 1500° F. The coating has a thickness of about 3 to 15 mils, the preferred thickness being about 5 mils. This thickness is critical since any coating materially thinner than 3 mils will permit excessive temperatures to develop in the bearing, while coatings much in excess of 15 mils will not permit the insert to be retained in place in the casting under service conditions and do not have the strength to hold up under heavy bearing loads.

The heat shield coating may be composed of high temperature organic or inorganic materials or combinations thereof which do not decompose at a significant rate at temperatures of up to 1500° F., and have low coefficient of thermal conductivity namely not above 0.03 calorie. The coating may be composed of polytetrafluoroethylene (PTFE) which is filled with a high proportion of such materials as glass fiber, quartz fibers or powder, mica, asbestos, graphite, ceramic fibers, fused silica, and the like or mixtures of two or more such materials having relatively low coefficients of thermal conductivity. Such materials are usable at temperatures of up to about 1500° F. without oxidizing or outgassing.

Further, the heat shield coating may be composed of a formed asbestos shape impregnated with aluminum phosphate which is adapted to cover and adhere to all surfaces of the bearing which are exposed to the molten metal during the die casting procedure. The thinnest treated asbestos shield obtainable is about 10 mils thick.

In addition, the heat shield coating may be composed of a cementatious or adhesive material which may be composed of about equal portions of magnesium oxide and zircon together with a binder such as magnesium ammonium phosphate.

The heat shield coating may also be composed of higher strength insulation material such as zircon aluminum phosphate comprising 75 parts of zircon, and 8 to 20 parts of aluminum phosphate.

The primary purpose of the heat shield coating is thermal insulation rather than adherence to hold the bearing in place. However, the combination of adherence and thermal insulation is an advantage in some applications for holding the bearing insert in place. Such coatings are applied in the form of a slurry which is painted on the surfaces of the bearing insert which will be exposed to the die casting metal.

Inasmuch as the metal such as aluminum may have a casting temperature of as high as 1500° F. the coating should have a thickness of about 5 mils in order to insulate the bearing from the heat of the metal. A coating thickness of about 5 mils prevents the bearing from becoming hotter than about 600° F. Inasmuch as the die cast metal such as aluminum is cooled rapidly to a much lower temperature, the heat shield coating serves its purpose and the bearing insert is not damaged from the excessive heat of the die cast metal.

Where the bearing insert is likely to be subjected to excessive vibration or other stresses which are likely to cause it to become dislodged from its position in the surface of the die casting, the heat shield coating may be composed of a strongly adhesive material or cement which also has substantially high thermal shielding properties. In the alternative the bearing may be provided with interlocking tapered edges or ends such as edge 21 in the bearing 17 in FIG. 3 so that the die cast metal 20 forms a strong dovetail shape 19 for securing the bearing 17 tightly in place.

The following example is illustrative of the present invention:

EXAMPLE I

A sleeve bearing similar to that shown in the bearing 10 in FIG. 1 is mounted in position on the wall of a die casting mold. The bearing is composed of 70% silver (100 mesh), 20% polytetrafluoroethylene (50 mesh), and 10% tungsten diselenide ($WSe_2$) (200 mesh) by powder metallurgical procedures including the application of heat and 50 tons per square inch of pressure whereby the silver, polytetrafluoroethylene and tungsten diselenide are bonded together. The surfaces of the sleeve bearing are then coated with a 5 mil thick slurry of heat shielding material which is composed of a 50% mixture of magnesium oxide and 50% zircon with magnesium ammonium phosphate as a binder which has a coefficient of thermal conductivity of about 0.0019 calorie.

After the coating material has set, molten aluminum at about 1500° F. is die cast around the coated bearing insert and solidified. A unitary assembly of the die casting with the bearing insert firmly incorporated is then removed from the die cast mold and is ready for use as a cylinder for cooperating with a compressor in a refrigerator.

EXAMPLE II

In the foregoing example the coating of cement is replaced by a coating of zircon and aluminum phosphate which is painted on the bearing as a slurry composed of 75 weight percent zircon and 25 weight percent aqueous aluminum phosphate, the latter of which includes 50% water which, after evaporating, leaves aluminum phosphate binder residue in the amount equal to half the original weight thereof. The total thickness of the zircon-aluminum phosphate coating is about 5 mils. The coating has a coefficient of thermal conductivity of about 0.00157 calorie. The coating of 5 mils is sufficient to prevent the excessive heat of the die cast metal from damaging the bearing insert such as by causing it to warp, oxidize or disintegrate. Likewise, the heat shield coating of zircon and aluminum phosphate is stable and devoid of subsequent oxidation or outgassing which would damage the die cast metal during its solidification.

EXAMPLE III

In the foregoing Example I the coating is replaced by a coating of asbestos sheet which has been treated with aluminum phosphate. The treated asbestos sheet coating has a total thickness of about 10 mils and it has a coefficient of thermal conductivity of less than 0.002 calorie. Although the treated asbestos coating has somewhat less adherence or bonding properties between the bearing insert and the die casting than do the coating materials of Examples I and II, it is highly satsifactory as a heat insulation coating for the bearing and prevents the heat of the liquid die cast metal from penetrating to and damaging the bearing insert.

Accordingly, the method of the present invention provides a solid state self-lubricating bearing insert for a die cast metal by which the heat of the die cast metal is prevented from damaging the bearing insert during the casting cycle such as for a compressor part. Moreover, heat shielded solid state bearings for die castings are widely acceptable in such products as motors, motorized parts which are die cast.

It will be understood that the above specification and drawings are merely exemplary and not in limitation of the invention.

What is claimed is:
1. A bearing comprising a die casting; a thin solid lubricant bearing insert comprising a mixture of at least one metal matrix selected from a group consisting of nickel, silver, iron, copper, and gold with embedded solid lubricant particles selected from at least one of the group consisting of disulfides and diselenides of tungsten and molybdenum, calcium difluoride, and boron nitride; and a thin heat shield layer disposed between the casting and the bearing insert comprising polytetrafluoroethylene filled with a high proportion of a filler material having a low thermal conductivity selected from at least one of the group consisting of glass fiber, quartz fiber, quartz powder, mica, asbestos, graphite, ceramic fibers, fused silica, asbestos impregnated with aluminum phosphate, magnesium oxide and zircon in equal parts together with magnesium ammonium phosphate, and zircon aluminum phosphate, the heat shield having a thickness of from about 3 to 15 mils and having a coefficient of thermal conductivity of up to about 0.03 calorie, whereby the bearing has superior mechanical strength and oxidation resistance at an operating temperature of up to about 1500° F.

References Cited

UNITED STATES PATENTS

| | | | |
|---|---|---|---|
| 938,689 | 11/1909 | Nichols | 164—75 |
| 1,339,084 | 5/1920 | Worrall | 308—239 |
| 1,955,981 | 4/1934 | Smith | 164—75 |
| 2,396,730 | 3/1946 | Whitfield | 164—75 |
| 2,435,991 | 2/1948 | Whitfield | 164—75 |
| 2,686,091 | 8/1954 | Young | 156—294 X |
| 2,690,004 | 9/1954 | Crawford | 164—111 X |
| 2,728,698 | 12/1955 | Rudner | 154—43 |
| 3,056,709 | 10/1962 | Rising | 308—238 X |
| 3,119,640 | 1/1964 | Laudig | 308—237 X |
| 3,133,477 | 5/1964 | Meijer | 308—5 X |
| 3,165,983 | 1/1965 | Thomas | 92—169 |
| 3,172,797 | 3/1965 | Bungardt | 308—237 |
| 3,191,252 | 6/1965 | Webbere | 164—75 |
| 3,347,737 | 10/1967 | Harford | 308—238 X |
| 3,350,143 | 10/1967 | Lichowsky | 308—239 X |

MARTIN P. SCHWADRON, *Primary Examiner.*

LUCIOUS L. JOHNSON, *Assistant Examiner.*

U.S. Cl. X.R.

161—216; 308—237, 239; 164—75, 100